United States Patent

[11] 3,633,892

| [72] | Inventor | Danforth Holley |
| | | Grosse Pointe Shores, Mich. |
| [21] | Appl. No. | 6,699 |
| [22] | Filed | Jan. 29, 1970 |
| [45] | Patented | Jan. 11, 1972 |
| [73] | Assignee | Holley Plastics Company |
| | | Warren, Mich. |

[54] PLASTIC TRAY STRUCTURE AND METHOD OF PRODUCTION
7 Claims, 3 Drawing Figs.

[52] U.S. Cl.................................................. 263/47 A, 263/2 R
[51] Int. Cl.................................................. F27b 21/04
[50] Field of Search............................................. 263/47, 47 A, 48, 2; 25/153

[56] References Cited
UNITED STATES PATENTS

| 1,769,841 | 7/1930 | Jones............................ | 263/48 |
| 3,157,718 | 11/1964 | O'Leary et al................ | 25/153 X |
| 3,179,724 | 4/1965 | Jones............................ | 25/153 |
| 3,499,634 | 3/1970 | Rea.............................. | 263/2 |

*Primary Examiner*—John J. Camby
*Attorney*—Whittemore, Hulbert & Belknap

ABSTRACT: A plastic tray for supporting ceramic members or the like during firing thereof which will disintegrate after the ceramic members have attained sufficient strength to be self-supporting and a method of production of the tray is disclosed. The tray disclosed includes a plurality of cylindrical cups vacuum formed in a plastic sheet for receiving individual members to be fired which cuts have bottoms including intermittent, perpendicular reinforcing corrugations therein. The corrugations in the bottom of the cups are produced in vacuum forming the trays due to a screen positioned beneath the female die used in forming the trays.

PATENTED JAN 11 1972

3,633,892

INVENTOR.
DANFORTH HOLLEY
BY Whittemore,
Hulbert & Belknap
ATTORNEYS

PLASTIC TRAY STRUCTURE AND METHOD OF PRODUCTION

BACKGROUND OF THE INVENTION

1. Field of the Invention

The invention relates to vacuum forming of plastic material and refers more specifically to vacuum forming of a tray for supporting ceramic members for firing, which tray is constructed of plastic material having temperature characteristics such that the tray will disintegrate after the ceramic members have hardened sufficiently to be self-supporting due to the heat of firing thereof and which tray includes reinforcing corrugations on the bottom of cylindrical cups formed in the tray.

2. Description of the Prior Art

In the past reusable trays for supporting ceramic members for firing have been relatively expensive and subject to rapid deterioration due to the temperature extremes to which the trays are subjected during firing of the ceramic members. Wherein trays of cardboard and the like have been provided for supporting ceramic members during firing, they have in the past lacked the requisite support for the ceramic members until the members were self-supporting or have left objectionable ash after disintegrating due to the heat of firing of the ceramic material.

SUMMARY OF THE INVENTION

In accordance with the invention there is provided a plastic tray for supporting ceramic members such as spark plug parts during firing thereof, which trays disintegrate without leaving an objectionable ash due to the heat of firing the ceramic members after the ceramic members have become strong enough to be self-supporting. The plastic trays are produced by vacuum forming a heated plastic sheet over a female die beneath which a screen has been positioned to provide perpendicular intermittent corrugations in the bottoms of cups formed in the trays for receiving individual spark plug parts. The trays are formed by both mechanical and vacuum forces and are particularly strong and form sustaining.

DESCRIPTION OF THE PREFERRED EMBODIMENT

Figure 1:
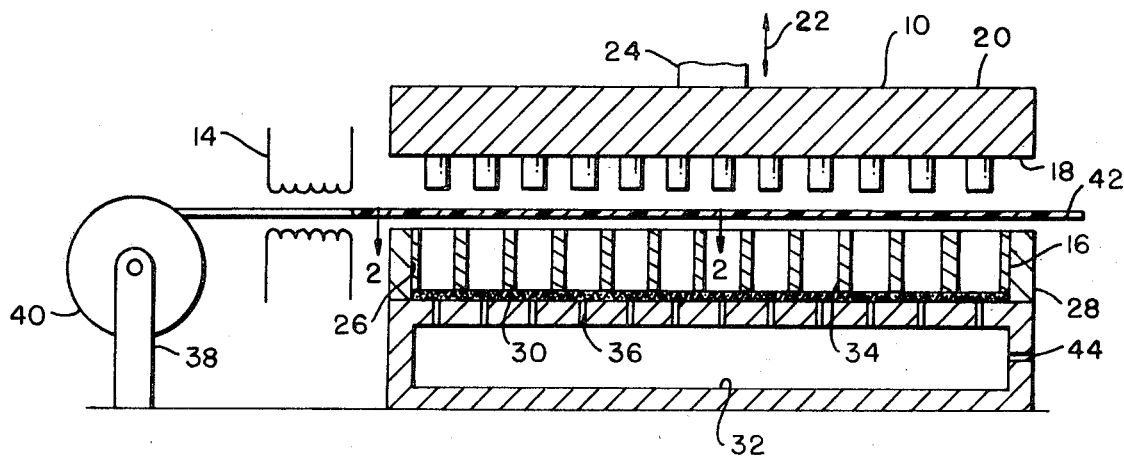
FIG. 1 is a longitudinal cross section through vacuum-forming equipment for forming the tray structure of the invention in accordance with the method of the invention.
Figure 2:
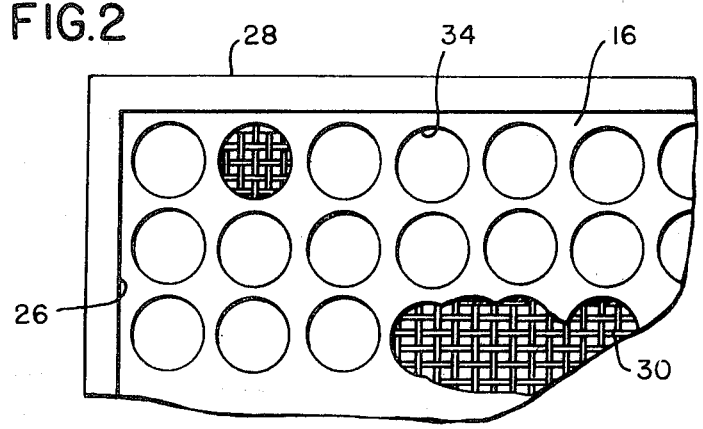
FIG. 2 is an enlarged partial section view of the vacuum-forming apparatus illustrated in FIG. 1 taken substantially on the line 2—2 in FIG. 1.

As shown in FIG. 1, the vacuum-forming apparatus 10 for producing trays 12 includes heating means 14, a female die 16 and a male die 18. The male die 18 is connected to an upper platen 20 which is movable in the direction of the arrows 22 toward and away from the female die 16 on the ram 24. The female die 16 is positioned in a recess 26 in a platen 28 on a wire screen 30 over a vacuum chamber 32. The vacuum chamber 32 is connected to each of the individual openings 34 in the female die 16 by means of the vacuum openings 36 and the horizontal communication provided by the screen 30.

The vacuum-forming apparatus 10 further includes the structure 38 for pivotally supporting a roll of sheet plastic material 42. The plastic material 42, in accordance with the invention may be, for example, cellulose butyrate or unoriented polystyrene. Presently, the cellulose butyrate is used due to its better forming characteristics, although the unoriented polystyrene is more desirable from the point of view of the ash left and the strength thereof. The unoriented polystyrene, however, is somewhat difficult to vacuum form since it has a better memory characteristic than the butyrate and tends to warp.

Other materials such as polypropylene, polyethylene and acetate have been investigated for use in the trays 12 with less success than the cellulose butyrate and unoriented polystyrene.

Figure 3:
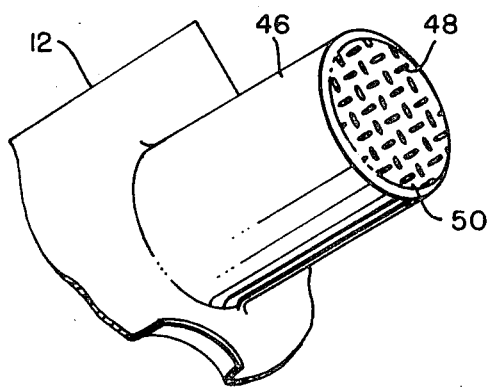
FIG. 3 is an enlarged perspective view of a portion of a tray constructed in accordance with the invention particularly illustrating the corrugations provided on the bottom of the cylindrical cups of the trays in accordance with the invention.

In forming the trays 12, the plastic sheet 42 which is approximately 10 mils thick is heated to between 225° and 250° F. by the heating means 14 of the vacuum-forming apparatus 10. After heating of the sheet 42, the sheet is placed over the female die 16 and vacuum is drawn in the chamber 32 through opening 44 by vacuum-drawing apparatus, not shown. The heated plastic sheet 42 is thus drawn into the individual openings 34 in the female die 16 to form separate cup-shaped portions 46, one of which at the corner of a tray 12 is illustrated in FIG. 3.

Vacuum forming of the cups 46 is aided by mechanical force applied to the plastic sheet 42 by the male die member 18 on movement of the ram 24 toward the female die member 16. In actual practice it has been found that to provide proper reinforcing corrugations 48 in the bottom 50 of the cups 46 of the tray 12 that the mechanical force should be approximately 10 percent of the total forming force and that the vacuum force applied to the sheets should be approximately 90 percent of the total applied forming force.

With the indicated heat and forming force applied to the plastic sheet 42, the bottoms 50 of the cups 46 of the trays being formed engage the screen 30 in the recess 26 of the platen 28 to form the corrugations 48 which extend perpendicularly in two directions on the bottoms 50 with the intermittent corrugations in one direction extending across the line of corrugations in the other direction between the intermittent corrugations in the other direction. This configuration of corrugations provided on the bottom 50 of the cups 46 of the trays 12 has been found to produce an unusually stiff cup permitting reduction of the thickness in the sheet material 42 and preventing undesired warping of the trays 12 which may, for example, have 17 rows of cups in each direction of a rectangular tray approximately a foot square, each one-half inch in diameter and three-fourth inch in height.

In use the trays are positioned on the bottoms 50 of the cup 46 formed therein. Individual ceramic spark plug parts are placed in the individual cups and the tray is placed in a firing oven for the ceramic parts. The parts are fired either by bringing the oven up to a predetermined heat or more exactly by moving the trays with the ceramic parts therein through the oven on a continuous belt so that heat is applied gradually to the ceramic members. When the ceramic material has been fired sufficiently to be self-supporting, the heat of the furnace has risen to a temperature sufficient to disintegrate the trays 12 so that they pass out of the furnace as a gas leaving little or no ash and leaving the ceramic spark plug parts self-supporting.

What I claim as my invention is:

1. A heat-destructible plastic tray for supporting ceramic members or the like during firing thereof until the ceramic members have sufficient strength to support themselves after which the trays disintegrate due to applied firing heat comprising a plurality of cup-shaped recesses in a plastic sheet having cylindrical sidewalls and bottoms closed and means reinforcing the bottoms thereof.

2. Structure as set forth in claim 1 wherein the means reinforcing the bottoms of the cup-shaped recesses of the tray comprise corrugations in the bottoms.

3. Structure as set forth in claim 2 wherein the corrugations in the bottoms of the cup-shaped recesses of the tray extend in perpendicular directions.

4. Structure as set forth in claim 3 wherein the corrugations are intermittent in both directions and the corrugations in one direction are provided across the line of corrugations in the other direction.

5. Structure as set forth in claim 1 wherein the trays are constructed of one of cellulose butyrate and unoriented polystyrene.

6. A plastic tray for supporting ceramic members or the like during firing thereof until the ceramic members have sufficient strength to support themselves after which the trays disintegrate due to applied firing heat comprising a plastic heat-destructible sheet including a plurality of closely spaced cup-shaped recesses therein, each of said recesses having cylindrical sidewalls extending perpendicularly to said plastic sheet and closed bottoms extending parallel to said plastic sheet formed from the plastic sheet by vacuum forming, said bottoms being deformed to provide reinforcing by a screen placed in the bottom of the vacuum-forming die therefor against which the plastic of the bottom of the cups is forced during the vacuuming forming of the cups whereby the deformation of the bottom of the cups includes intermittent lines of deformations therein extending at right angles to each other with the deformations forming the intermittent lines extending in one direction positioned between the deformations forming the intermittent lines extending in the other direction so that the bottoms of the cups tend to be retained in a substantially flat plane parallel to the plane of the plastic sheet and the cups have less tendency to deform.

7. Structure as set forth in claim 6 wherein the trays are constructed on one of cellulose butyrate and unoriented polystyrene.

* * * * *